United States Patent
Jeong

(10) Patent No.: US 7,665,880 B2
(45) Date of Patent: *Feb. 23, 2010

(54) BACKLIGHT ASSEMBLY AND DISPLAY APPARATUS HAVING THE SAME

(75) Inventor: Seung-Chul Jeong, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 12/032,533

(22) Filed: Feb. 15, 2008

(65) Prior Publication Data

US 2008/0137372 A1    Jun. 12, 2008

Related U.S. Application Data

(63) Continuation of application No. 11/378,212, filed on Mar. 16, 2006, now Pat. No. 7,344,295, which is a continuation of application No. 10/818,589, filed on Apr. 5, 2004, now Pat. No. 7,036,973.

(30) Foreign Application Priority Data

Oct. 11, 2003    (KR) ............................... 2003-70838

(51) Int. Cl.
*F21V 7/04*    (2006.01)

(52) U.S. Cl. ................... 362/633; 362/600; 362/606; 362/615; 362/628

(58) Field of Classification Search ................. 362/600, 362/606, 615, 628, 632–634; 349/58
See application file for complete search history.

(56) References Cited

U.S. PATENT DOCUMENTS

| | | |
|---|---|---|
| 6,820,992 B2 | 11/2004 | Yu et al. |
| 6,827,461 B2 | 12/2004 | Kao |
| 6,910,784 B2 | 6/2005 | Ito |

(Continued)

FOREIGN PATENT DOCUMENTS

CN    2488178    4/2002

(Continued)

OTHER PUBLICATIONS

Office Action for Chinese Patent Application No. 200410044768.5.

*Primary Examiner*—Sandra L O'Shea
*Assistant Examiner*—Meghan K Dunwiddie
(74) *Attorney, Agent, or Firm*—Innovation Counsel LLP

(57) ABSTRACT

The backlight assembly includes a lamp unit, a light guide plate and a receiving container. The light guide plate includes a light exiting surface, a light reflecting surface facing the light exiting surface, and side surfaces. The receiving container includes a frame plate and sidewall protruding from an outer edge of the frame plate to form a receiving space for receiving the lamp unit and the light guide plate. The first distance between an inner surface of the sidewall and an outer surface of the light guide plate at a first region is greater than a second distance between the inner surface of the sidewall and the outer surface of the light guide plate at a second region. The light guide plate is more spaced apart from the sidewall at the corners where much noise was made, in a general backlight assembly, so that the noise is reduced.

25 Claims, 8 Drawing Sheets

U.S. PATENT DOCUMENTS 6,929,392 B2 8/2005 Kim et al.
6,977,694 B2 12/2005 Natsuyama
7,036,973 B2 * 5/2006 Jeong .......................... 362/633
2003/0164903 A1 9/2003 Saito et al.
2004/0011690 A1 1/2004 Marfino et al.

FOREIGN PATENT DOCUMENTS

CN 1349126 5/2002

* cited by examiner

BACKLIGHT ASSEMBLY AND DISPLAY APPARATUS HAVING THE SAME

CROSS-REFERENCE TO RELATED APPLICATIONS

This application is a Continuation of U.S. patent application Ser. No. 11/378,212 filed on Mar. 16, 2006 now U.S. Pat. No. 7,344,295, which is a Continuation (under 35 USC 120) of U.S. patent application Ser. No. 10/818,589 filed on Apr. 5, 2004 now U.S. Pat. No. 7,036,973, which relies for priority upon Korean Patent Application No. 2003-70838 filed on Oct. 11, 2003. The contents of all applications are herein incorporated by reference in their entirety.

BACKGROUND OF THE INVENTION

1. Field of the Invention

The present invention relates to a backlight assembly and a display apparatus having the backlight assembly. More particularly, the present invention relates to a backlight assembly having reduced noise and a display apparatus having the backlight assembly.

2. Description of the Related Art

Generally, liquid crystal display apparatus includes a display unit that displays an image, and a backlight assembly that provides the display unit with a light.

The backlight assembly includes a lamp unit, a light guide plate and a mold frame. The lamp unit generates the light. The light guide plate guides the light generated from the lamp unit toward display unit. The mold frame receives the lamp unit and the light guide plate.

The lamp unit includes a lamp and a lamp reflector. The lamp reflector covers the lamp, such that the light generated from the lamp advances toward the light guide plate.

The light guide plate has a rectangular plate shape. The light generated from the lamp unit enters the light guide plate. Then, a path of the light is adjusted to exit the light guide plate via a front face of the light guide plate.

The mold frame includes a bottom plate and a sidewall surrounding the bottom plate. The bottom plate and the sidewall form a receiving space for receiving the lamp unit and the light guide plate. The lamp unit is disposed between the sidewall of the mold frame and the light guide plate.

When an impact or thermal heat is applied to the mold frame that receives the light guide plate and the lamp unit, the light guide plate may rattle inside the mold frame. Further, the light guide plate and the mold frame may be deformed due to the thermal heat, so that the light guide plate may rattle inside the mold frame. Thus, a noise is generated.

Especially, when the liquid crystal display apparatus is used in a portable device, the rattling becomes intense.

SUMMARY OF THE INVENTION

The present invention provides a backlight assembly having reduced noise.

The present invention also provides a display apparatus having the backlight assembly.

In an exemplary backlight assembly of the present invention, the backlight assembly includes a lamp unit, a light guide plate and a receiving container. The lamp unit generates a light. The light guide plate includes a light exiting surface, a light reflecting surface facing the light exiting surface, and side surfaces connecting the light exiting surface and the light reflecting surface. The receiving container includes a frame plate and sidewall protruding from an outer edge of the frame plate to form a receiving space for receiving the lamp unit and the light guide plate. The first distance between an inner surface of the sidewall and an outer surface of the light guide plate at a first region is greater than a second distance between the inner surface of the sidewall and the outer surface of the light guide plate at a second region.

In an exemplary display device of the present invention, the display device includes a lamp unit, a light guide plate, first and second receiving containers and a display panel. The lamp unit generates a light. The light guide plate includes a light exiting surface, a light reflecting surface facing the light exiting surface, and side surfaces connecting the light exiting surface and the light reflecting surface. The receiving container includes a frame plate and sidewall protruding from an outer edge of the frame plate to form a receiving space for receiving the lamp unit and the light guide plate. The first distance between an inner surface of the sidewall and an outer surface of the light guide plate at a first region is greater than a second distance between the inner surface of the sidewall and the outer surface of the light guide plate at a second region. The display panel is disposed on the first receiving container. The liquid crystal display panel receives a light exiting from the light exiting surface of the light guide plate to display an image. The second receiving container combines with the first receiving container to fix the liquid crystal display panel.

According to the present invention, the light guide plate is more spaced apart from the sidewall at the corners where much noise was made, in a general backlight assembly. Thus, the noise is reduced. Further, embossing patterns formed on the center portions of the light guide plate and the receiving container also reduces the noise.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE PREFERRED EMBODIMENTS

Hereinafter, the preferred embodiments of the present invention will be described in detail with reference to the accompanied drawings.

Embodiment 1

Figure 1:
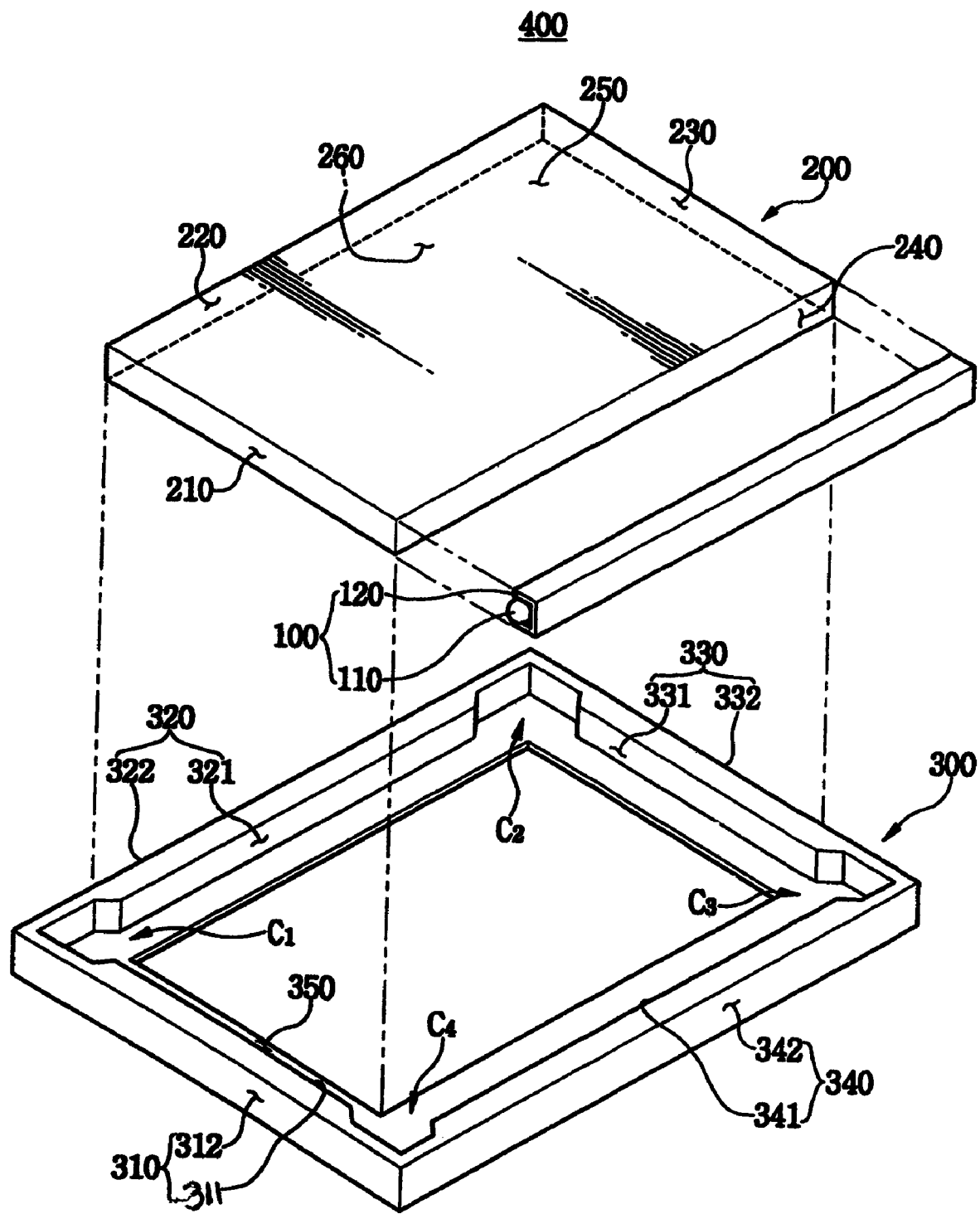
FIG. 1 is an exploded perspective view showing a backlight assembly according to a first exemplary embodiment of the present invention.
Figure 2:
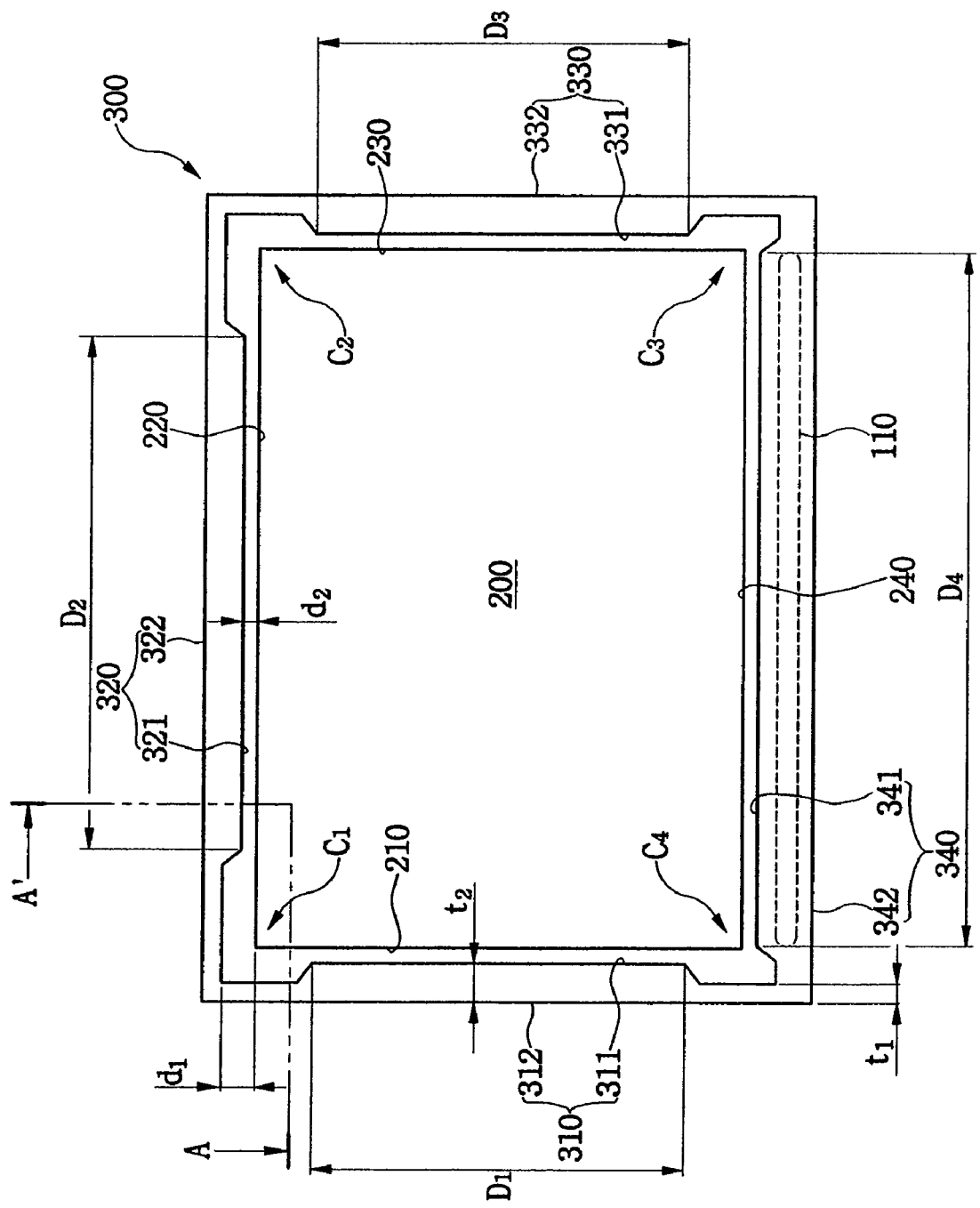
FIG. 2 is a plan view showing the backlight assembly of FIG. 1.

FIG. 1 is an exploded perspective view showing a backlight assembly according to a first exemplary embodiment of the present invention, and FIG. 2 is a plan view showing the backlight assembly of FIG. 1.

Referring to FIGS. 1 and 2, a backlight assembly 400 according to a first exemplary embodiment of the present invention includes a lamp unit 100, a light guide plate 200 and a mold frame 300. The lamp unit 100 generates a light. The light guide plate 200 guides the light generated from the lamp unit 100 toward a display unit (not shown). The mold frame 300 receives the lamp unit 100 and the light guide plate 200.

The light guide plate 200 includes first, second, third and fourth side surfaces 210, 220, 230 and 240, and upper and lower surfaces 250 and 260. The upper and lower surfaces 250 and 260 are facing with each other. The first, second, third and fourth side surfaces 210, 220, 230 and 240 connect the upper surface 250 with the lower surface 260.

The lamp unit 100 is disposed at the fourth side surface 240, so that a first light generated from the lamp unit 100 enters the light guide plate 200 through the fourth side surface (or light incident surface) 240 to form a second light. The lower surface 260 reflects the second light toward the upper surface 250, so that the second light exits the light guide plate 200 via the upper surface 250 to form a third light.

The lamp unit 100 includes a lamp 110 and a lamp reflector 120. The lamp 100 generates the first light. The lamp reflector 120 reflects the first light toward the fourth side surface 240.

The mold frame 300 includes a frame plate 350 and first, second, third and fourth sidewalls 310, 320, 330 and 340. The first, second, third and fourth sidewalls 310, 320, 330 and 340 protrude from an outer edge portion of the frame plate 350 to form a receiving space.

The mold frame 300 includes first, second, third and fourth corners C1, C2, C3 and C4. The first and second sidewalls 310 and 320 meet each other at the first corner C1. The second and third sidewall 320 and 330 meet each other at the second corner C2. The third and fourth sidewalls 330 and 340 meet each other at the third corner C3. The fourth and first sidewall 340 and 310 meet each other at the fourth corner C4.

Inner surfaces 311 and 321 of the first and second sidewalls 310 and 320 respectively are recessed toward outer surfaces 312 and 322 at the first corner C1. Inner surfaces 321 and 331 of the second and third sidewalls 320 and 330 respectively are recessed toward outer surfaces 322 and 332 at the second corner C2. Inner surfaces 331 and 341 of the third and fourth sidewalls 330 and 340 respectively are recessed toward outer surfaces 332 and 342 at the third corner C3. Inner surfaces 341 and 311 of the fourth and first sidewalls 340 and 310 respectively are recessed toward outer surfaces 342 and 312 at the fourth corner C4.

A first center portion D1 is formed between the first and fourth corners C1 and C4, and a second center portion D2 is formed between the first and second corners C1 and C2. A third center portion D3 is formed between the second and third corners C2 and C3, and a fourth center portion D4 is formed between the third and fourth corners C3 and C4.

A first thickness t1 of the first to fourth sidewalls 310 to 340 at the first to fourth corners C1 to C4 is thinner than a second thickness t2 of the first to fourth sidewalls 310 to 340 at the first to fourth center portions D1 to D4, wherein the first and second thickness t1 and t2 are defined as a distance between the inner and outer surfaces.

As shown in FIG. 2, when the receiving space of the mold frame 300 receives the light guide plate 200 and the lamp unit 100, the first to fourth side surfaces 210 to 240 of the light guide plate 200 face the inner surfaces 311 to 341 of the first to fourth sidewalls 310 to 340. The lamp unit 100 is disposed between the fourth sidewall 340 and the fourth side surface 240.

The inner surfaces 311 to 341 of the first to fourth sidewalls 310 and 340 are spaced apart from the first to fourth side surfaces 210 to 240 by a first distance d1 at the first to fourth corners C1 to C4. The inner surfaces 311 to 341 of the first to fourth sidewalls 310 and 340 are spaced apart from the first to fourth side surfaces 210 to 240 by a second distance d2 at the first to fourth center portions D1 to D4. The first distance d1 is greater than the second distance d2 by about 0.1 mm to about 0.5 mm.

That is, even when the light guide plate 200 is deformed, the light guide plate 200 does not make contact with the inner surfaces 311 to 341 at the first to fourth corners C1 to C4, so that a noise generated due to a friction is not made at the first to fourth corners C1 to C4. Instead, the light guide plate 200 makes contact with the inner surfaces 311 to 341 at the first to fourth center portions D1 to D4, so that the noise may be made at the first to fourth center portions D1 to D4.

Hereinafter, a structure for reducing the noise is explained referring to FIGS. 3 to 5.

Figure 3:
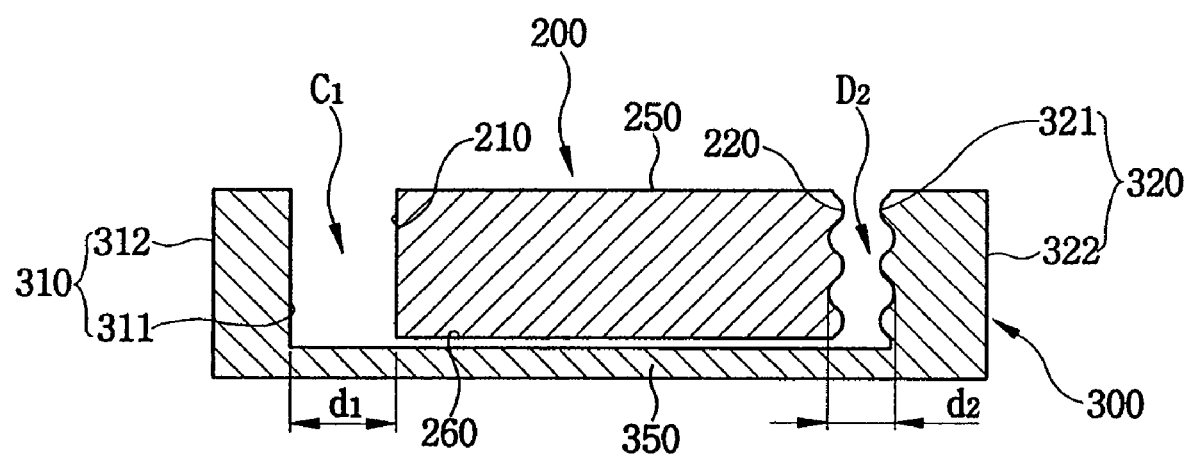
FIG. 3 is a cross-sectional view taken along the line A-A' of FIG. 2.

FIG. 3 is a cross-sectional view taken along the line A-A' of FIG. 2.

Referring to FIG. 3, an inner surface 311 of the first sidewall 310 of the mold frame 300 is spaced apart from the first side surface 210 of the light guide plate 200 by a first distance d1 at a first corner C1. An inner surface 311 of the first sidewall 310 of the mold frame 300 is spaced apart from the first side surface 210 of the light guide plate 200 by a second distance d2 at a first center portion D1. The first distance d1 is greater than the second distance d2 by about 0.1 mm to about 0.5 mm.

Inner surface 321 of the second sidewall 320 corresponding to the second center portion D2 includes embossing patterns. The embossing patterns are roundly formed. The second side surface 220 of the light guide plate 200 also includes embossing patterns. The embossing patterns have been exaggerated in the figure. Actual size of the embossing patterns is only a few μm.

Thus, an area of a region, where the light guide plate 200 and the mold frame 300 make contact with each other, is minimized to reduce a noise generated due to a friction.

The second to fourth corners C2 to C4 have same structure as the first corner C1, and the second to fourth center portions D2 to D4 have same structure. However as shown in FIG. 2, a length of the first center portion D1 is substantially same as a length of the third center portion D3, and a length of the second center portion D2 is different from a length of the fourth center portion D4.

Figure 4:
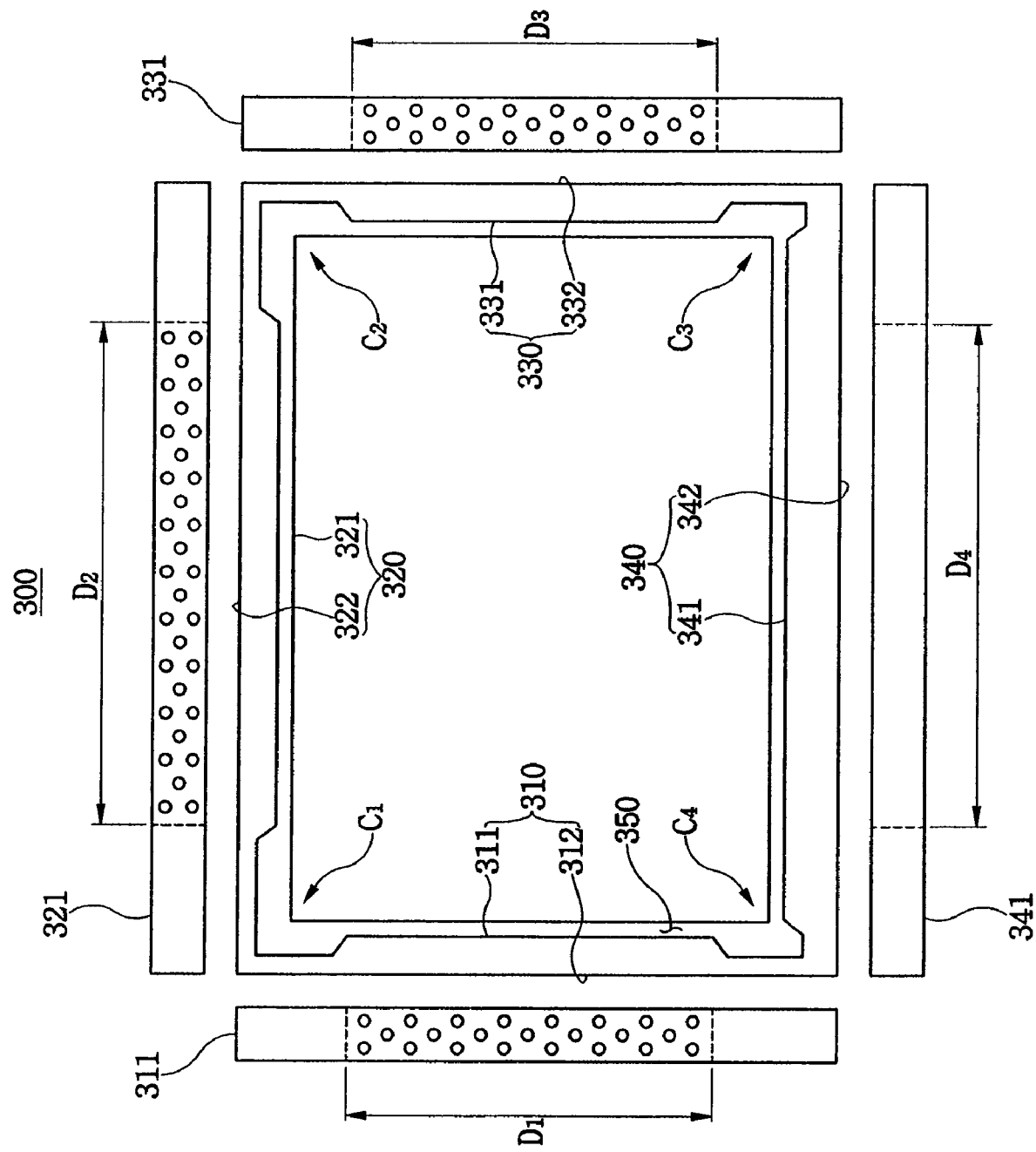
FIG. 4 is plan and side views showing a mold frame of FIG. 1.
Figure 5:
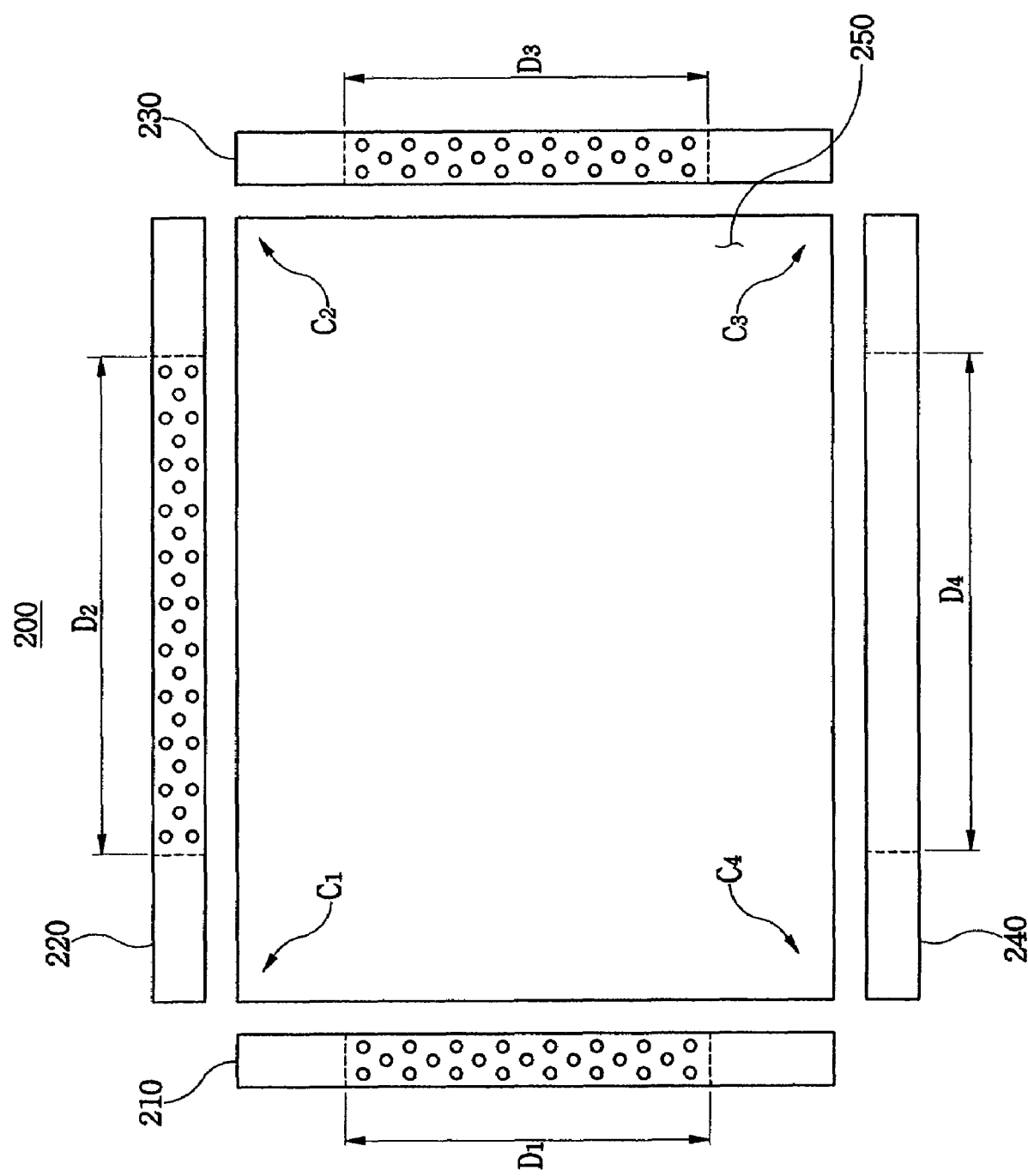
FIG. 5 is plan and side views showing a light guide plate of FIG. 1.

FIG. 4 is plan and side views showing a mold frame of FIG. 1, and FIG. 5 is plan and side views showing a light guide plate of FIG. 1.

Referring to FIG. 4, a mold frame 300 includes a frame plate 350 and first, second, third and fourth sidewalls 310, 320, 330 and 340. The first to fourth sidewalls 310 to 340 protrude from an outer edge of the frame plate 350. The first to fourth sidewalls 310 to 340 have a first thickness t1 at first to fourth corners C1 to C4, and the first to fourth sidewalls 310 to 340 have a second thickness t2 at first to fourth center portions D1 to D4.

Inner surfaces 311, 321 and 331 of the first to third sidewalls 310, 320 and 330 have a smooth surface (or flat surface) at the first to third corners C1 to C3, but the inner surfaces 311, 321, and 331 have embossing patterns at the first to third center portions D1 to D3.

As described above, the lamp unit 100 is interposed between the fourth sidewall 340 and the fourth side surface 240 of the light guide plate 200, so that the fourth side surface 240 does not make contact with the inner surface 341. Thus, the inner surface 341 may have smooth surface (or flat surface).

Referring to FIGS. 4 and 5, first, second and third side surfaces 210, 220 and 230 have smooth surface at first, second and third corners C1, C2 and C3, and the first, second and third side surfaces 210, 220 and 230 have embossing patterns at first, second and third center portions D1, D2, and D3.

A lamp unit is disposed adjacent to a fourth side surface 240, so that the fourth side surface 240 receives a light generated from the lamp unit. Thus, the fourth side surface 240 does not make contact with the fourth sidewall 340 of the mold frame 300. The fourth side surface 240 has a smooth surface.

When the mold frame 300 receives the light guide plate 200, a first distance between the mold frame 300 and the light guide plate 200 at corners is greater than a second distance between the mold frame 300 and the light guide plate 200 at center portions. That is, a space for allowing a deformation is formed at the corners.

Thus, even though the first, second and third sidewalls 310, 320 and 330 and the first, second, and third side surface 210, 220 and 230 have smooth surface, a friction of the mold frame 300 and the light guide plate 200 is reduced to relieve a noise.

The second distance between the first, second and third sidewalls 310, 320 and 330 at the first, second and third center portions D1, D2 and D3 is shorter than the first distance between the first, second and third sidewalls 310, 320 and 330 at the first, second and third corners C1, C2 and C3. Thus, the embossing patterns are formed to relieve the noise.

Further, the embossing patterns are only formed at the first, second and third center portions to reduce malproduct.

Embodiment 2

Figure 6:
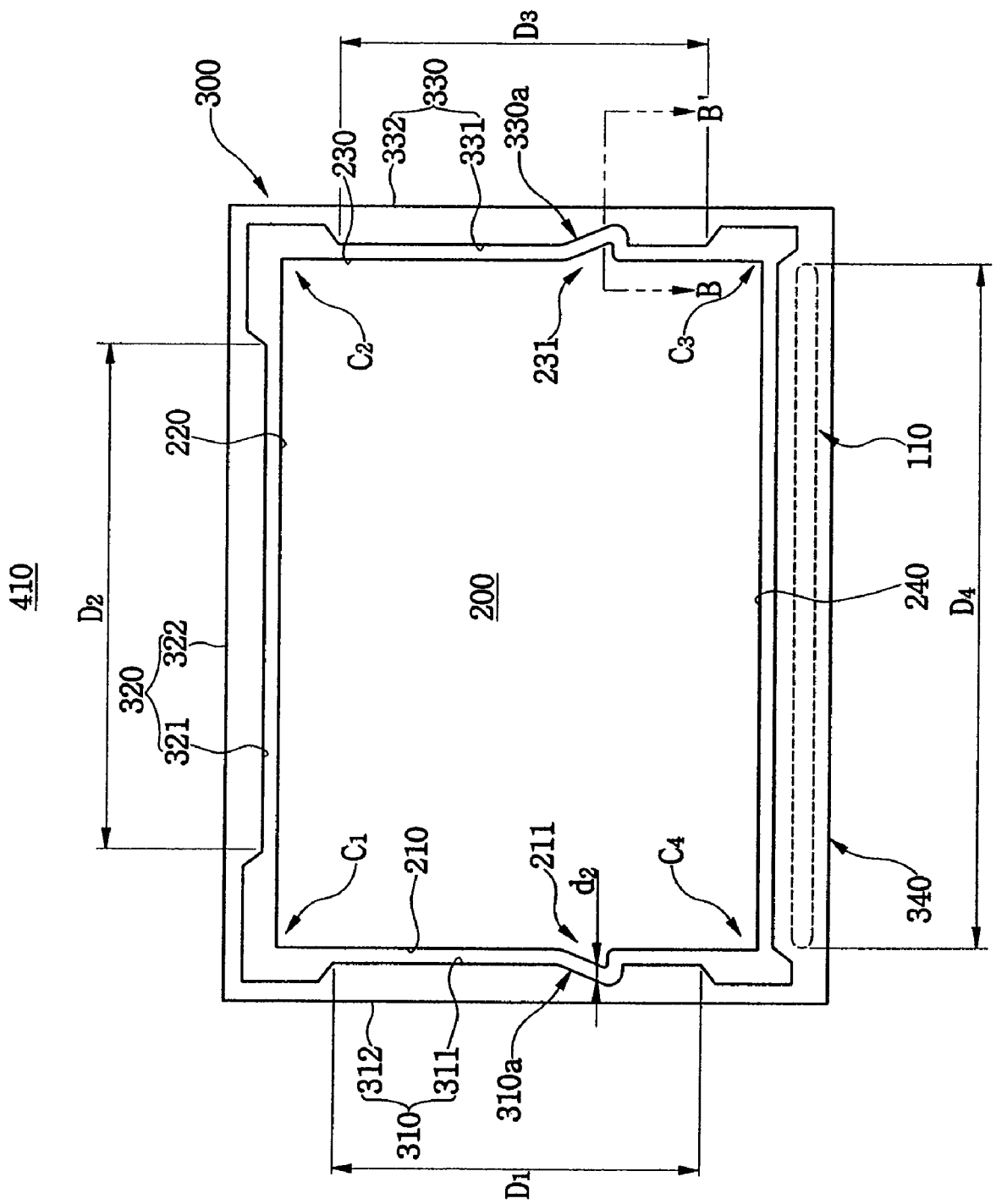
FIG. 6 is a plan view showing a backlight assembly according to a second exemplary embodiment of the present invention.
Figure 7:
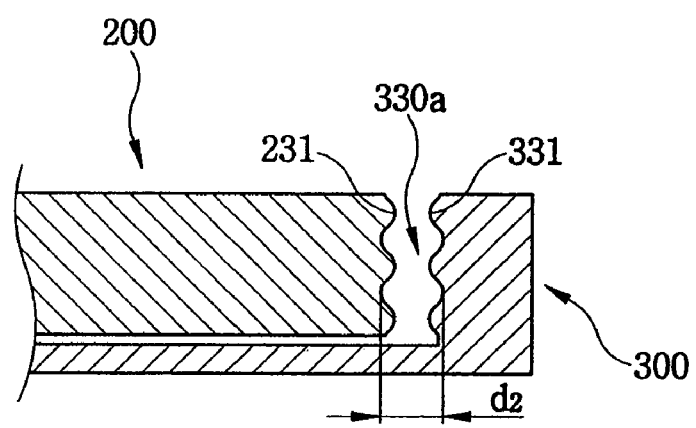
FIG. 7 is a cross-sectional view taken along the line B-B' of FIG. 6.

FIG. 6 is a plan view showing a backlight assembly according to a second exemplary embodiment of the present invention, and FIG. 7 is a cross-sectional view taken along the line B-B' of FIG. 6. The backlight assembly of the present embodiment is same as in Embodiment 1 except for a protruding portion of a light guide plate, and a receiving recess of a mold frame. Thus, the same reference numerals will be used to refer to the same or like parts as those described in Embodiment 1 and any further explanation will be omitted.

Referring to FIGS. 6 and 7, a backlight assembly 410 according to a second exemplary embodiment of the present invention includes a lamp unit 100, a light guide plate 200 and a mold frame 300. The lamp unit 100 generates a light. The light guide plate 200 receives the light, and adjusts an advancing path of the light. The mold frame 300 receives the lamp unit 100 and the light guide plate 200.

The light guide plate 200 includes first, second, third and fourth side surfaces 210, 220, 230 and 240, an upper surface (or light exiting surface) 250 and a lower surface (or light reflecting surface) 260. The upper surface 250 and the lower surface 260 face with each other. The lamp unit 100 is disposed adjacent to the fourth side surface 240, so that a light generated from the lamp unit 100 enters the light guide plate 200 through the fourth side surface (or light incident surface) 240.

The light guide plate 200 further includes first and second protruding portions 211 and 231. The first and second protruding portions 211 and 231 protrude from the first and third side surfaces 210 and 230 respectively. The first and second protruding portions 211 and 231 protrude more in a direction from the second side surface 220 to the fourth side surface 240, so that the first and second protruding portions 211 and 231 have a slope.

The mold frame 300 includes a frame plate 350, first, second, third and fourth sidewalls 310, 320, 330 and 340. The first, second, third and fourth sidewalls 310, 320, 330 and 340 protrude from an outer edge portion of the frame plate 350 to form a receiving space. First and second receiving recesses 310a and 330a for receiving the first and second protruding portions 211 and 231 of the light guide plate 200 are formed on the first and third sidewalls 310 and 330.

When the mold frame 300 receives the light guide plate 200, the first and second receiving recesses 310a and 330a receive the first and second protruding portions 211 and 231 respectively. Thus, the light guide plate 200 may not rattle inside of the mold frame 300.

The first protruding portion 211 is formed at the first center portion D1 between the first and fourth corners C1 and C4. The second protruding portion 231 is formed at the third center portion D3 between the second and third corners C2 and C3. The second protruding portion 231 is formed at the third center portion D3 between the second and third corners C2 and C3. Thus, the first and second protruding portions 211 and 231 are spaced apart from the first and third sidewalls 310 and 330 by the second distance d2 of FIG. 2.

Referring to FIG. 7, a second protruding portion 231 has an embossed surface, and a second receiving recess 330a has the embossed surface. Thus, when the second receiving recess 330a receives the second protruding portion 231, a noise due to a friction between the mold frame 300 and the light guide plate 200 is reduced.

FIGS. 6 and 7 show a combination structure of the light guide plate 200 and the mold frame 300 that prevents the light guide plate 200 from rattling. However, various combination structures of the light guide plate 200 and the mold frame 300 may be formed, and the combination structure of the present invention is not limited to the FIGS. 6 and 7.

In FIGS. 1 to 7, the sidewalls 210 to 240 of the light guide plate 200 and the internal surfaces 311 to 341 have embossed patterns. Small particles may be shoot to the sidewalls 210 to 240 and the internal surfaces 311 to 341 to be roughed.

Embodiment 3

Figure 8:
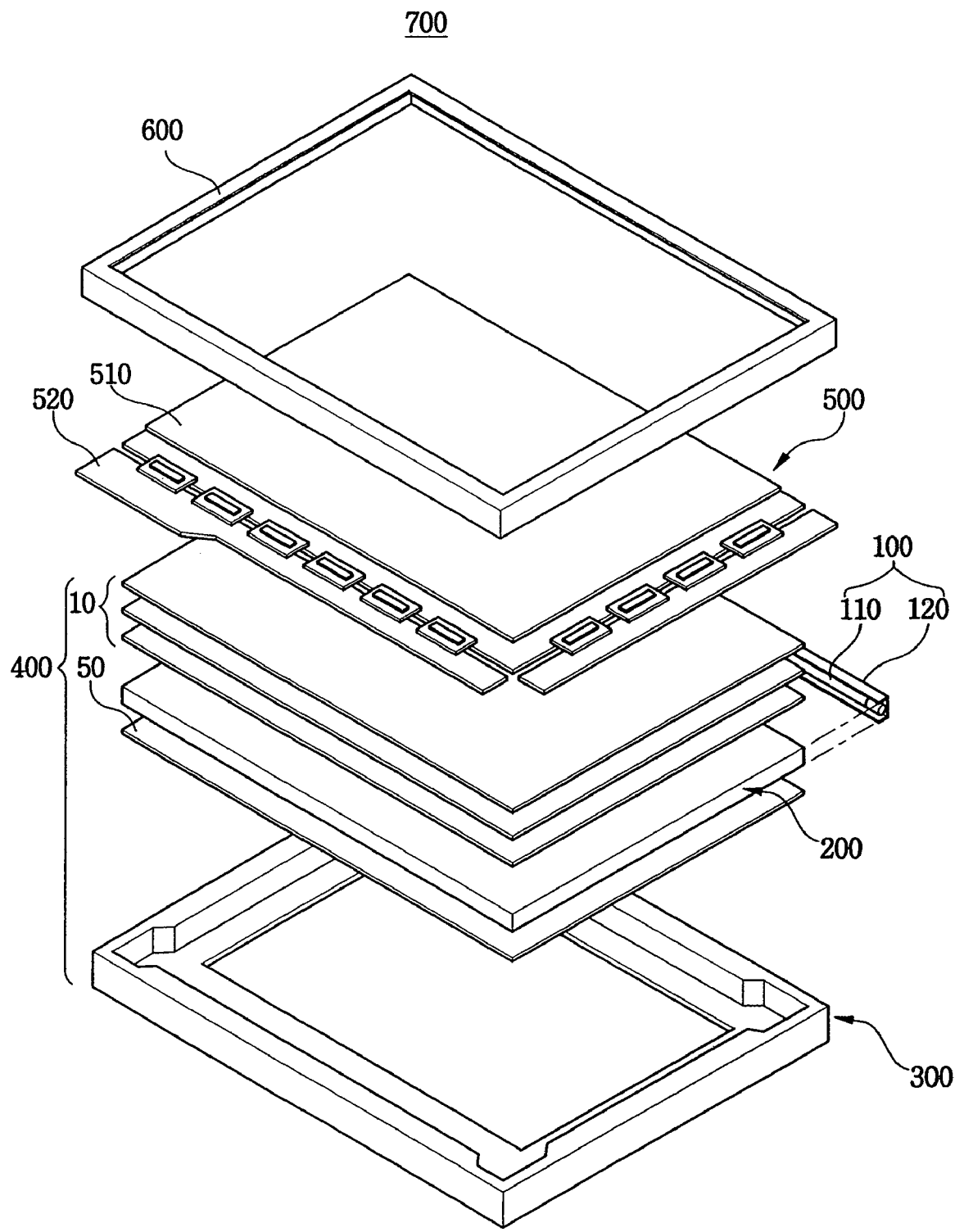
FIG. 8 is an exploded perspective view showing a liquid crystal display apparatus according to a third exemplary embodiment.

FIG. 8 is an exploded perspective view showing a liquid crystal display apparatus according to a third exemplary embodiment. The display apparatus of the present embodiment includes a backlight assembly that is same as in Embodiment 1. Thus, the same reference numerals will be used to refer to the same or like parts as those described in Embodiment 1 and any further explanation will be omitted.

Referring to FIG. 8, a liquid crystal display apparatus 700 according to a third exemplary embodiment of the present invention includes a display unit 500 and a backlight assembly 400. The liquid crystal display apparatus 700 may be used for portable devices, for example, such as a laptop computer, a personal digital assistant (PDA), etc.

The backlight assembly 400 provides the display unit 500 with a light. The display unit 500 transforms the light provided from the backlight assembly into an image.

The display unit 500 includes a liquid crystal display panel 510 and a driver printed circuit board 520.

The backlight assembly 400 includes a lamp unit 100, a light guide plate 200 and a mold frame 300. The lamp unit 100 generates the light. The light guide plate 200 guides the light toward the liquid crystal display panel 510. The mold frame 300 receives the lamp unit 100 and the light guide plate 200.

Optical sheets 10 for enhancing a luminance and viewing angle are disposed over the light guide plate 200, and a reflector 50 for reflecting a light that is leaked from the light guide plate 200 toward the light guide plate 200 again is disposed below the light guide plate 200.

The mold frame 300 receives the reflector 50, the light guide plate 200 and the lamp unit 100. Then, the mold frame 300 receives the optical sheets 10 and the liquid crystal display panel 510. The driver printed circuit board 520 is bent to be disposed under the reflector 50.

Then, a chassis 600 is combined with the mold frame 300 to fix the liquid crystal display panel 510 to the mold frame 300.

According to the present invention, a receiving container (or mold frame) includes a frame plate and sidewalls protruding from an edge portion of the frame plate to form a receiving space for receiving a light guide plate. The sidewall is spaced apart from the light guide plate by a first distance at corners, and the sidewall is spaced apart from the light guide plate by a second distance that is shorter than the first distance at center portions.

That is, the light guide plate is more spaced apart from the sidewall at the corners where much noise was made, in a general backlight assembly. Thus, the noise is reduced. Further, embossing patterns formed on the center portions of the light guide plate and the receiving container also reduce the noise.

Further, the embossing patterns are formed only at the center portions to increase productivity.

Having described the exemplary embodiments of the present invention and its advantages, it is noted that various changes, substitutions and alterations can be made herein without departing from the spirit and scope of the invention as defined by appended claims.

What is claimed is:

1. A backlight assembly comprising:
a light generating unit that generates light;
an optical plate that includes a light incident surface receiving the light and a light exiting surface; and
a receiving container that includes a mold frame receiving the optical plate, wherein the inner surface of the sidewall is recessed at a first region, so that a first distance between an inner surface of the mold frame and an outer surface of the optical plate at the first region is greater than a second distance between the inner surface of the mold frame and the outer surface of the optical plate at a second region.

2. The backlight assembly of claim 1, wherein the mold frame has a substantially rectangular frame shape having first, second, third and fourth corners.

3. The backlight assembly of claim 2, wherein the first region corresponds to the first, second, third and fourth corners, and the second region corresponds to a region between the corners.

4. The backlight assembly of claim 1, wherein a recession depth of the inner surface at the first region is in a range from about 0.1 mm to about 0.5 mm.

5. The backlight assembly of claim 4, wherein the first distance is greater than the second distance by about 0.1 mm to bout 0.5 mm.

6. The backlight assembly of claim 1, wherein the inner surface of the mold frame includes embossing patterns at the second region and smooth surface at the first region.

7. The backlight assembly of claim 6, wherein the optical plate has embossing patterns at the second region and smooth surface at the first region.

8. The backlight assembly of claim 1, wherein the optical plate includes a protruding portion, and the mold frame of the receiving container includes a receiving recess for receiving the protruding portion of the optical plate.

9. The backlight assembly of claim 8, wherein surfaces of the protruding portion and the receiving recess have embossing patterns respectively.

10. The backlight assembly of claim 1 further comprising a reflector disposed below the optical plate.

11. The backlight assembly of claim 1, wherein the light generating unit is disposed under the optical plate.

12. The backlight assembly of claim 11 further comprising a reflector disposed below the light generating unit.

13. A display apparatus comprising:
a light generating unit that generates a light;
an optical plate that includes a light incident surface receiving the light and a light exiting surface;
a first receiving container that includes a mold frame receiving the optical plate, wherein the inner surface of the mold frame is recessed at a first region, so that a first distance between an inner surface of the mold frame and an outer surface of the optical plate at a first region is greater than a second distance between the inner surface of the mold frame and the outer surface of the optical plate at a second region;
a display panel disposed on the first receiving container, the display panel receiving a light exiting from the light exiting surface of the optical plate to display an image; and
a second receiving container that combines with the first receiving container to fix the display panel.

14. The display apparatus of claim 13, wherein the first receiving container has substantially rectangular frame shape having first, second, third and fourth corners.

15. The display apparatus of claim 14, wherein the first region corresponds to the first, second, third and fourth corners, and the second region corresponds to a region between the corners.

16. The display apparatus of claim 13, wherein a recession depth of the inner surface at the first region is in a range from about 0.1 mm to about 0.5 mm.

17. The display apparatus of claim 16, wherein the first distance is greater than the second distance by about 0.1 mm to bout 0.5 mm.

18. The display apparatus of claim 13, wherein the inner surface of the mold frame includes embossing patterns at the second region and smooth surface at the first region.

19. The display apparatus of claim 18, wherein the optical plate has embossing patterns at the second region and smooth surface at the first region.

20. The display apparatus of claim 13, wherein the optical plate includes a protruding portion, and the mold frame of the first receiving container includes a receiving recess for receiving the protruding portion of the optical plate.

21. The display apparatus of claim 20, wherein surfaces of the protruding portion and the receiving recess have embossing patterns respectively.

22. The display apparatus of claim 13 further comprising a reflector disposed below the optical plate.

23. The display apparatus of claim 13, wherein the light generating unit is disposed under the optical plate.

24. The display apparatus of claim 23 further comprising a reflector disposed below the light generating unit.

25. The display apparatus of claim 13, wherein the display apparatus is used for a laptop computer.

* * * * *